(12) United States Patent
Narita

(10) Patent No.: US 9,678,655 B2
(45) Date of Patent: Jun. 13, 2017

(54) INFORMATION PROCESSING APPARATUS, STEREOSCOPIC DISPLAY METHOD, AND PROGRAM

(75) Inventor: Tomoya Narita, Kanagawa (JP)

(73) Assignee: Sony Corporation, Tokyo (JP)

( * ) Notice: Subject to any disclaimer, the term of this patent is extended or adjusted under 35 U.S.C. 154(b) by 782 days.

(21) Appl. No.: 13/197,481

(22) Filed: Aug. 3, 2011

(65) Prior Publication Data

US 2012/0050501 A1    Mar. 1, 2012

(30) Foreign Application Priority Data

Aug. 30, 2010   (JP) ................. P2010-192248

(51) Int. Cl.
*H04N 13/04* (2006.01)
*G06F 3/0488* (2013.01)
*G06F 3/01* (2006.01)

(52) U.S. Cl.
CPC ............ *G06F 3/0488* (2013.01); *G06F 3/011* (2013.01); *G06F 2203/04101* (2013.01); *H04N 13/0456* (2013.01); *H04N 13/0497* (2013.01)

(58) Field of Classification Search
CPC ......... G06F 2203/04101; G06F 3/0488; G06F 3/011; H04N 13/0456; H04N 13/0497
USPC ......................................................... 348/51
See application file for complete search history.

(56) References Cited

U.S. PATENT DOCUMENTS

2007/0211023 A1 *  9/2007  Boillot .......................... 345/156
2008/0278450 A1 * 11/2008  Lashina ........................ 345/173
2009/0058830 A1 *  3/2009  Herz et al. .................... 345/173
2010/0039504 A1     2/2010  Takahashi et al.
2010/0091012 A1     4/2010  Newton et al.
2010/0095206 A1 *  4/2010  Kim .............................. 715/702
2010/0192086 A1 *  7/2010  Kocienda et al. ............ 715/773

FOREIGN PATENT DOCUMENTS

| EP | 2015165 | 1/2009 |
| JP | 03-168693 | 7/1991 |
| JP | 2004-280496 | 10/2004 |
| JP | 2010-45584 | 2/2010 |

OTHER PUBLICATIONS

Dec. 4, 2013, Extended European Search Report for related EP application No. 11178255.3.
Jan. 7, 2014, Japanese Office Action for related JP application No. 2010-192248.
Ehnes, et al., The Pen and Paper Paradigm—Supporting Multiple Users on the Virtual Table.
Sep. 24, 2014, CN communication issued for related CN application No. 201110249698.7.

* cited by examiner

*Primary Examiner* — Christopher S Kelley
*Assistant Examiner* — Matthew Kwan
(74) *Attorney, Agent, or Firm* — Paratus Law Group, PLLC

(57) ABSTRACT

A method is provided for displaying content to a user. The method comprises displaying content in a first position. The method further comprises detecting an operating member; and determining a distance between the member and a device. The method still further comprises displaying, if the distance between the member and the device is less than a predefined distance, the content in a second position appearing to be behind the first position, with respect to the user.

19 Claims, 15 Drawing Sheets

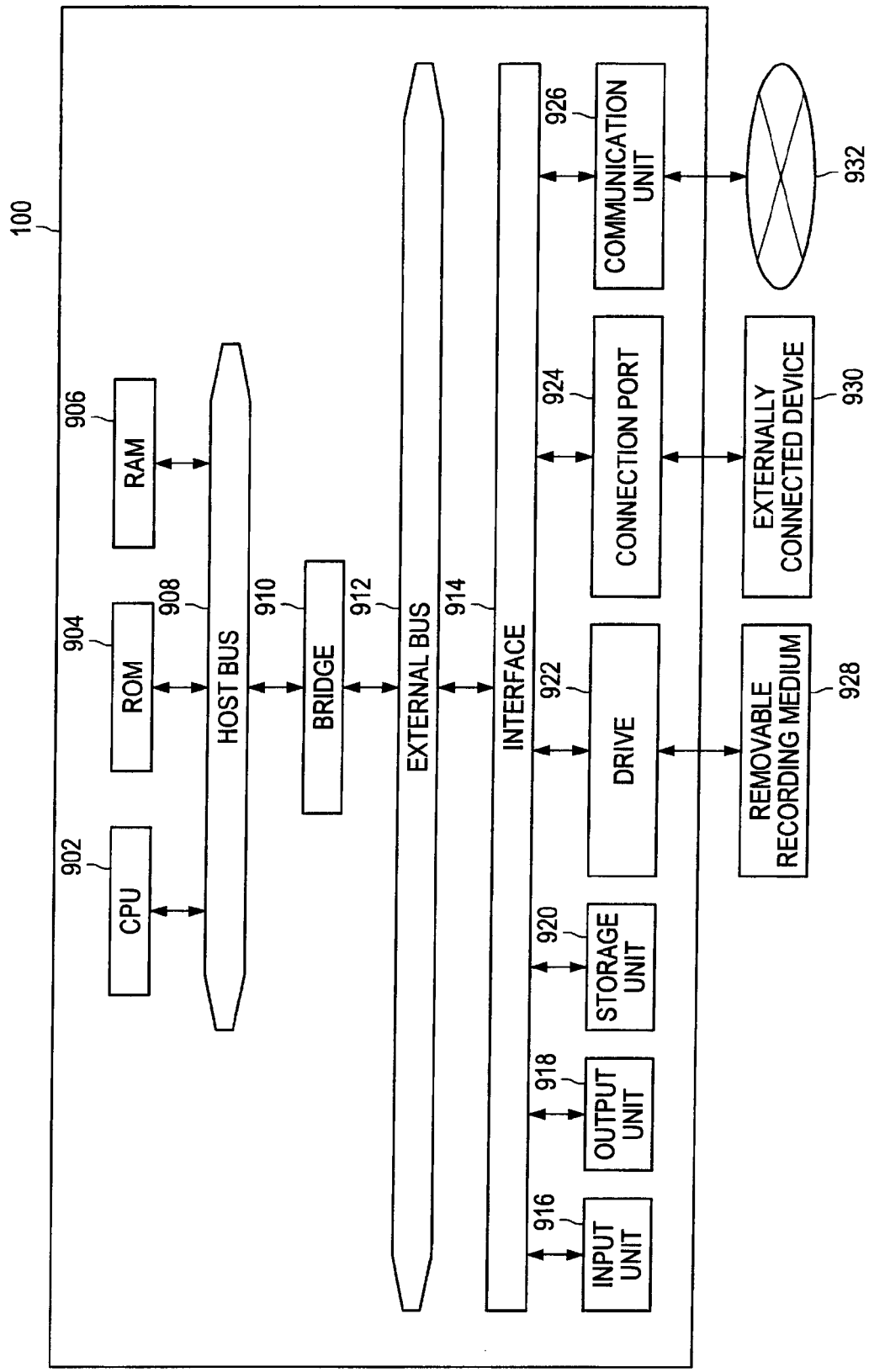

INFORMATION PROCESSING APPARATUS, STEREOSCOPIC DISPLAY METHOD, AND PROGRAM

BACKGROUND

The present disclosure relates to an information processing apparatus, a stereoscopic display method, and a program.

In recent years, stereoscopic display apparatuses capable of stereoscopically displaying a display object such as video content, an operation object or the like are put to practical use, and are becoming widespread. For example, there are several display apparatuses for televisions, portable game machines and personal computers (hereinafter, PCs) capable of stereoscopic display that are already in the market. It is expected that non-stereoscopic display apparatuses currently widely used will be gradually replaced by the stereoscopic display apparatuses in the future. In relation to such stereoscopic display apparatuses, JP 2010-045584A discloses a method of correcting a stereoscopic image that enables to accurately express the pop-out amount, pull-in amount or the like intended by the creator of a display object.

SUMMARY

As described, a stereoscopic display technology itself is widely known, but there exist various issues caused due to stereoscopic display. For example, when an object in the real world overlaps with a display object which is stereoscopically displayed, there arises an issue that a mismatch, regarding the sense of distance, occurs between the object actually having a three-dimensional shape and the display object which is stereoscopically shown by virtually realizing a parallax, thereby giving a viewing user an odd feeling. In light of the foregoing, it is desirable to provide an information processing apparatus, a stereoscopic display method, and a program which are novel and improved, and which are capable of reducing an odd feeling experienced by a user when an object in the real world nears a display screen on which a display object is stereoscopically displayed.

Accordingly, there is provided a method for displaying content to a user. The method comprises displaying content in a first position. The method further comprises detecting an operating member; and determining a distance between the member and a device. The method still further comprises displaying, if the distance between the member and the device is less than a predefined distance, the content in a second position appearing to be behind the first position, with respect to the user.

In a second aspect, there is provided a non-transitory computer-readable medium storing instructions which, when executed by a processor, perform a method of displaying content to a user. The method comprises displaying content in a first position. The method further comprises detecting an operating member; and determining a distance between the member and a device. The method still further comprises displaying, if the distance between the member and the device is less than a predefined distance, the content in a second position appearing to be behind the first position, with respect to the user.

In a third aspect, there is provided an apparatus for displaying content to a user, comprising a memory and a processor executing instructions stored in the memory. The processor executes instructions stored in the memory to display content in a first position. The processor further executes instructions stored in the memory to detect an operating member; and determine a distance between the member and a device. The processor still further executes instructions stored in the memory to display, if the distance between the member and the device is less than a predefined distance, the content in a second position appearing to be behind the first position, with respect to the user.

According to the embodiments of the present disclosure described above, it is possible to reduce an odd feeling experienced by a user when an object in the real world nears a display screen on which a display object is stereoscopically displayed.

BRIEF DESCRIPTION OF THE DRAWINGS

FIG. 15 is an explanatory diagram for describing an example hardware configuration of an information processing apparatus capable of realizing a function of the stereoscopic display apparatus according to the embodiment.

DETAILED DESCRIPTION OF THE EMBODIMENT(S)

Figure 1:
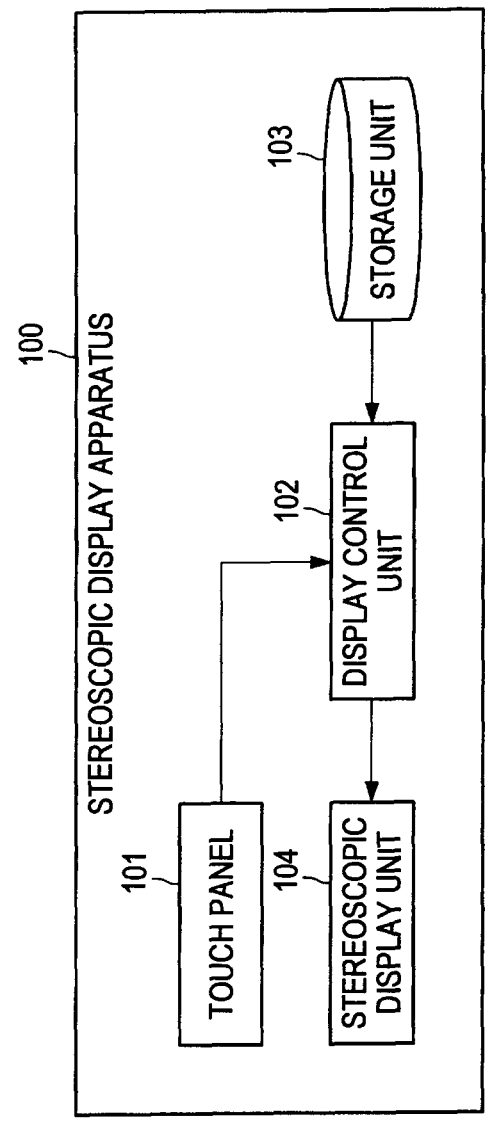
FIG. 1 is an explanatory diagram for describing a functional configuration of a stereoscopic display apparatus according to an embodiment of the present disclosure.

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Flow of Explanation]

The flow of explanation on an embodiment of the present disclosure which will be described below will be briefly stated here. First, a functional configuration of a stereoscopic display apparatus 100 according to the embodiment will be described with reference to FIG. 1. At the same time, a principle of stereoscopic display will be briefly described with reference to FIG. 2. Then, a display control method according to the embodiment and an operation of the stereoscopic display apparatus 100 for realizing the display control method will be described with reference to FIGS. 3 to 14. Then, an example hardware configuration of an information processing apparatus capable of realizing a function of the stereoscopic display apparatus 100 will be described with reference to FIG. 15. Lastly, technical ideas of the embodiment will be summarized and effects obtained by the technical ideas will be briefly described.

(Description Items)
1: Embodiment
    1-1: Functional Configuration of Stereoscopic Display Apparatus 100
    1-2: Display Control Method and Operation of Stereoscopic Display Apparatus 100
        1-2-1: (#1) Non-Stereoscopic Display of Display Object
        1-2-2: (#2) Inward Pushing of Display Object
        1-2-3: (#3) Blurry Display of Display Object
    1-3: Hardware Configuration
2: Summary

1: Embodiment

An embodiment of the present disclosure will be described. The present embodiment proposes a display control method capable of reducing an odd feeling experienced by a user when an object in the real world nears a display object, that is, content, which is stereoscopically displayed.

[1-1: Functional Configuration of Stereoscopic Display Apparatus 100]

First, a functional configuration of a stereoscopic display apparatus 100 capable of realizing the display control method according to the present embodiment will be described with reference to FIG. 1. FIG. 1 is an explanatory diagram for describing a functional configuration of the stereoscopic display apparatus 100 according to the present embodiment.

As shown in FIG. 1, the stereoscopic display apparatus 100 is mainly configured from a touch panel 101, a display control unit 102, a storage unit 103, and a stereoscopic display unit 104.

Additionally, the touch panel 101 corresponds to an input unit 916 in the hardware configuration described later. Also, the function of the display control unit 102 is realized by using a CPU 902 or the like in the hardware configuration described later. Furthermore, the function of the storage unit 103 is realized by a ROM 904, a RAM 906, a storage unit 920 or a removable recording medium 928 in the hardware configuration described later. Furthermore, the function of the stereoscopic display unit 104 is realized by an output unit 918 in the hardware configuration described later.

The touch panel 101 is means for detecting nearing of an operating tool, i.e., an operating member. The touch panel 101 is provided on a display screen, that is, a device, of the stereoscopic display unit 104. The touch panel 101 detects the position of an operating tool which has neared the display screen of the stereoscopic display unit 104. The touch panel 101 may also have a function of detecting a distance between the operating tool which has neared the display screen of the stereoscopic display unit 104 and the display screen. Furthermore, the touch panel 101 may also have a function of detecting the pressure of the operating tool pressing the display screen of the stereoscopic display unit 104. The functions of the touch panel 101 are realized by a capacitive touch panel or an optical touch panel, for example.

The capacitive touch panel is for detecting a capacitance occurring between the touch panel and the operating tool and detecting, from the change in the capacitance, the nearing or contacting of the operating tool. When the distance between the touch panel and the operating tool changes, the capacitance occurring between them also changes. It is also known that when the touch panel is pressed by the operating tool, the capacitance occurring between them changes according to the pressing. Accordingly, when using the capacitive touch panel, not only is the nearing of the operating tool to the touch panel detected, but also the distance between the operating tool and the touch panel and the pressure of the operating tool pressing the touch panel can be detected.

On the other hand, the optical touch panel is for detecting, by an optical sensor, an operating tool which has neared or contacted the touch panel. Various types of optical touch panels are known, and recently, an optical touch panel called "in-cell type" was developed. The in-cell optical touch panel emits light on the operating tool from the inside of a display panel and detects the position of the operating tool by detecting the light reflected by the operating tool. When the operating tool is present near the display panel, light is strongly reflected by the operating tool. Accordingly, the distance between the display panel and the operating tool can be detected based on the intensity of the light reflected by the operating tool.

When the nearing or contacting of the operating tool is detected by the touch panel 101, information indicating the nearing or contacting of the operating tool (hereinafter, proximity information) is input from the touch panel 101 to the display control unit 102. Position information indicating the position of the operating tool or the like is also input to the display control unit 102 from the touch panel 101. When the proximity information, the position information or the like is input, the display control unit 102 controls display of an display object by the stereoscopic display unit 104 according to the proximity information, the position information or the like which has been input. The display control unit 102 is means for causing the stereoscopic display unit 104 to display the display object.

For example, the display control unit 102 reads image data stored in the storage unit 103 and causes the stereoscopic display unit 104 to display the image data that has been read. Also, the display control unit 102 causes the stereoscopic display unit 104 to display video content, a GUI (Graphical User Interface) or the like. At this time, the display control unit 102 performs operation for stereoscopically displaying a display object such as the image data, the video content, the GUI or the like. For example, the display control unit 102 performs operation for causing the display object to pop out of the display screen of the stereoscopic display unit 104 or to be pushed inward into the display screen.

Figure 2:
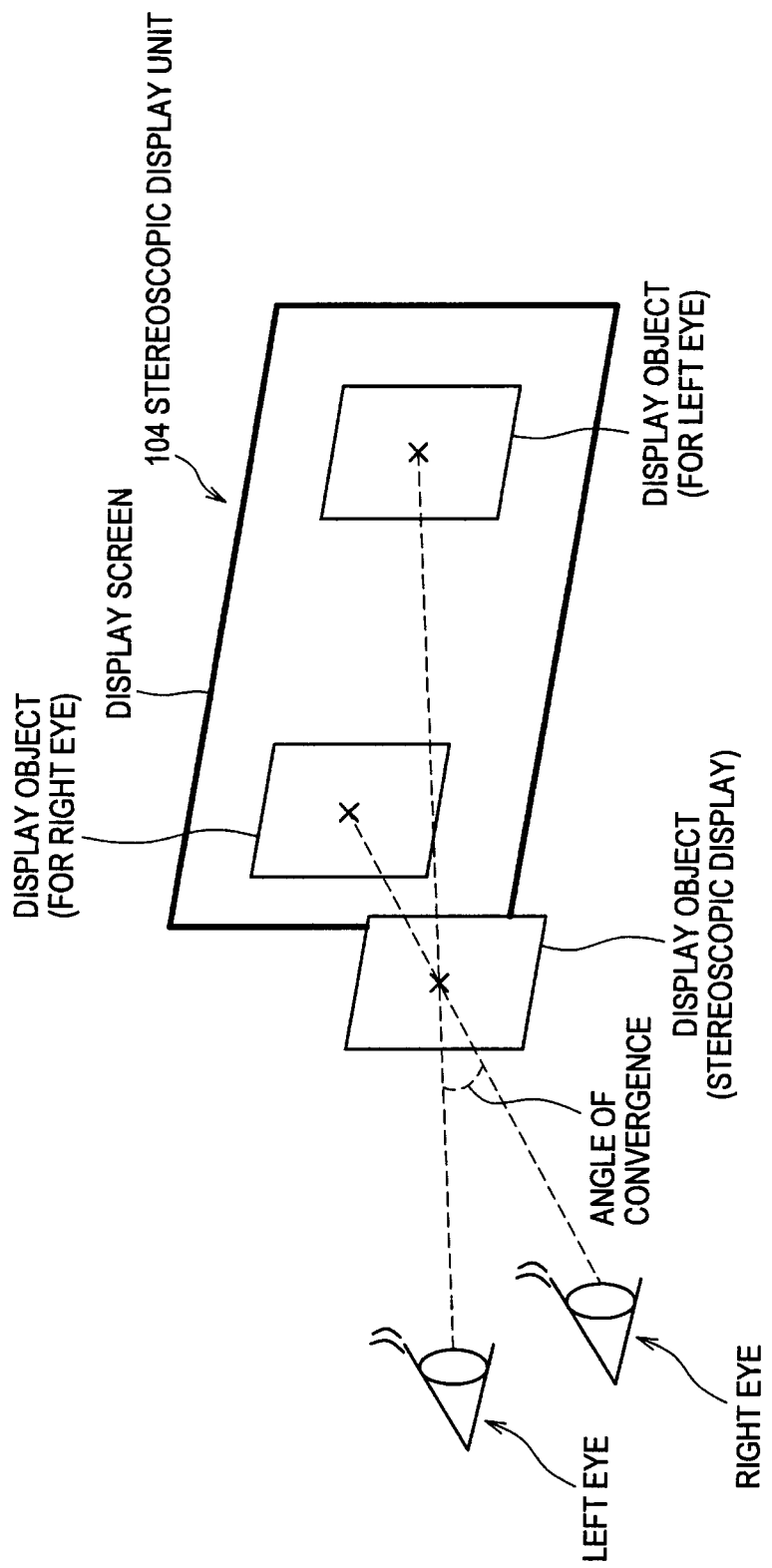
FIG. 2 is an explanatory diagram for describing a principle of stereoscopic display.

A principle of the stereoscopic display will be briefly described here with reference to FIG. 2. FIG. 2 is an explanatory diagram for describing a principle of the stereoscopic display.

As shown in FIG. 2, to stereoscopically show a display object, a display object for a right eye and a display object for a left eye are displayed separately from each other on the display screen, and the display object for a right eye is made to be seen only by the right eye and the display object for a left eye is made to be seen only by the left eye. In many cases, polarized light is used to cause the display object for a right eye to be seen only by the right eye and the display object for a left eye to be seen only by the left eye. For example, the display object for a right eye is displayed with light linearly polarized in a first direction, and the display object for a left eye is displayed with light linearly polarized in a second direction orthogonal to the first direction. Furthermore, by having a lens that lets the light that is linearly polarized in the first direction pass through worn on the right eye and a lens that lets the light that is linearly polarized in the second direction pass through worn on the left eye, a situation can be created where the display object for a right eye is seen only by the right eye and the display object for a left eye is seen only by the left eye.

When such a situation is created, a display object will be seen displayed at a position where a line of sight connecting the right eye and the display object for a right eye and a line of sight connecting the left eye and the display object for a left eye intersect. Furthermore, an angle of convergence can be adjusted by controlling the distance between the display object for a right eye and the display object for a left eye. The degree of pop-out of the display object that is stereoscopically displayed will change when the angle of convergence changes.

That is, by controlling the display positions of the display objects for right and left eyes on the display screen, the degree of pop-out or the degree of inward-push of the display object that is stereoscopically displayed can be controlled. Additionally, a method of realizing stereoscopic display by using polarized light is described here, but the present embodiment is not limited to such, and any display control method capable of stereoscopically displaying a display object can be applied.

FIG. 1 will be again referred to. As described above, the display control unit 102 stereoscopically displays a display object by controlling display of the display objects for right and left eyes. Information on the degree of pop-out or the degree of inward-push of the display object determined by the display control unit 102 (hereinafter, control information) is input to the stereoscopic display unit 104. Data on the display object read by the display control unit 102 from the storage unit 103 is also input to the stereoscopic display unit 104. When the control information is input, the stereoscopic display unit 104 displays the display object based on the control information that is input.

In the foregoing, the functional configuration of the stereoscopic display apparatus 100 has been described.

[1-2: Display Control Method and Operation of Stereoscopic Display Apparatus 100]

Next, a display control method according to the present embodiment and an operation of the stereoscopic display apparatus 100 for realizing the display control method will be described with reference to FIGS. 3 to 14. The display control method described below is for reducing an odd feeling experienced by a user when an object in the real world nears a display object that is stereoscopically displayed.

(1-2-1: (#1) Non-Stereoscopic Display of Display Object)

Figure 3:
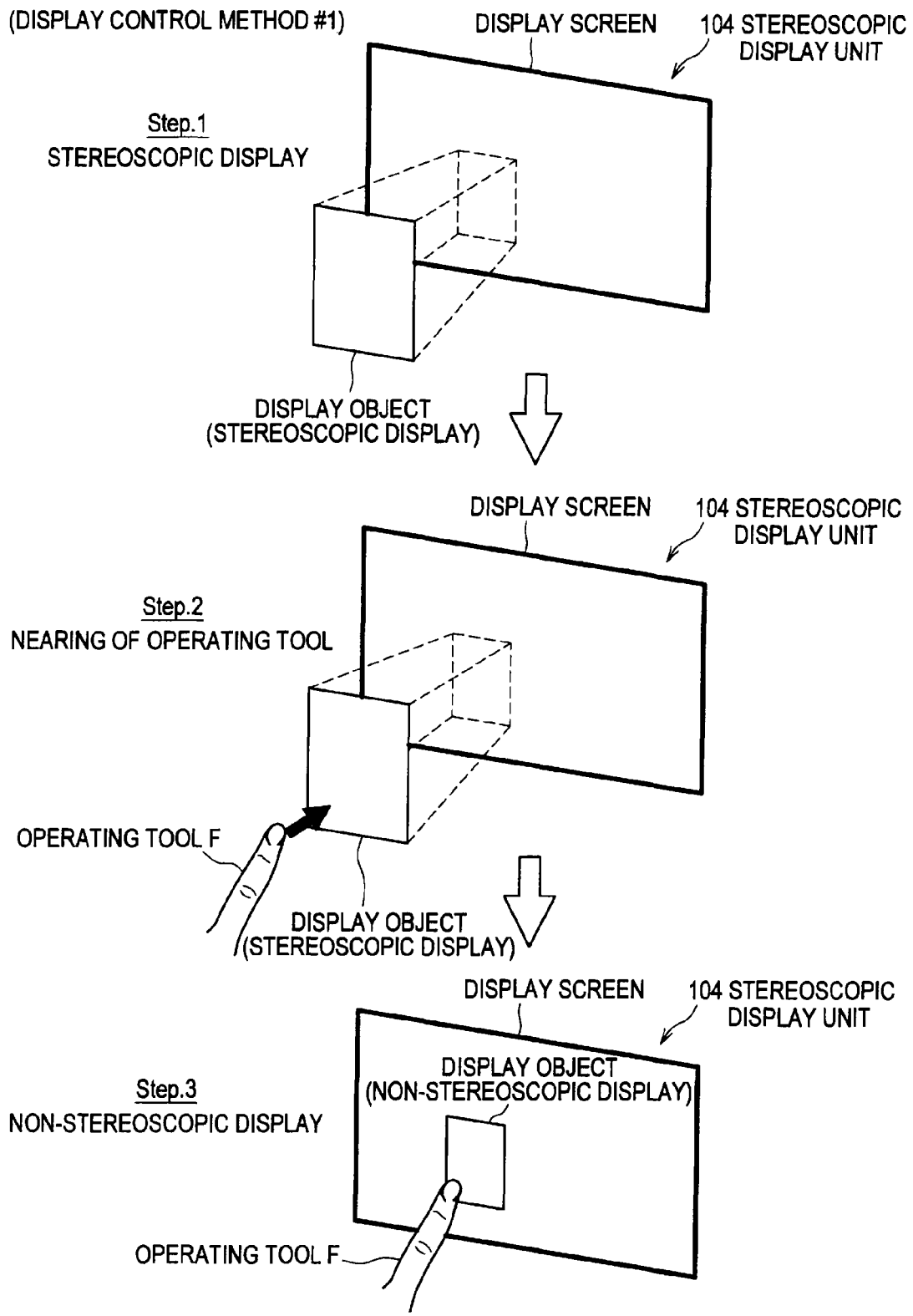
FIG. 3 is an explanatory diagram for describing a display control method (#1) according to the embodiment.

First, FIG. 3 will be referred to. The display control method described here is for switching, when an operating tool F nears the display screen of the stereoscopic display unit 104, a display mode of a display object that is stereoscopically displayed, i.e., a three-dimensional image, to non-stereoscopic display. FIG. 3 is an explanatory diagram for describing this display control method. Additionally, a stereoscopic display object that is viewed by a user is schematically shown in FIG. 3.

It is assumed as shown in FIG. 3 that a display object is stereoscopically displayed by the stereoscopic display unit 104 (Step. 1). When an operating tool F nears the display screen of this stereoscopic display unit 104 (Step. 2), the display control unit 102 switches the display mode of the display object that is stereoscopically displayed to non-stereoscopic display (Step. 3). When the display mode is switched to non-stereoscopic display in Step. 3, no mismatch will occur between the sense of distance to the display object and the sense of distance to the operating tool F. As a result, a user will not experience an odd feeling when the operating tool F nears the display object that is stereoscopically displayed.

In the foregoing, the display control method according to the present embodiment has been described.

Figure 4:
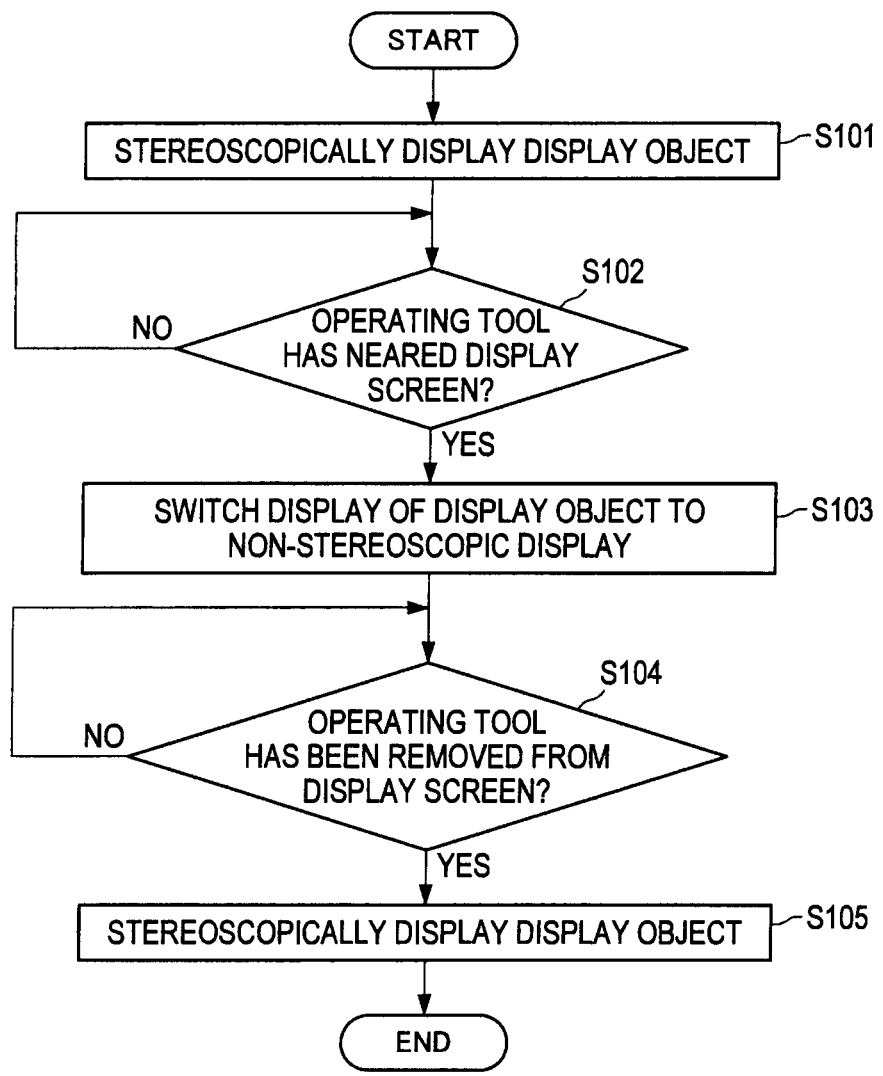
FIG. 4 is an explanatory diagram for describing an operation (#1) of the stereoscopic display apparatus according to the embodiment.

Next, FIG. 4 will be referred to. FIG. 4 is an explanatory diagram showing an operation of the stereoscopic display apparatus 100 for realizing the display control method which has been described with reference to FIG. 3.

As shown in FIG. 4, the stereoscopic display apparatus 100 stereoscopically displays a display object on the stereoscopic display unit 104 by using a function of the display control unit 102 (S101). Next, the stereoscopic display apparatus 100 detects whether or not an operating tool F has neared the display screen of the stereoscopic display unit 104, by using a function of the touch panel 101 (S102). In the case an operating tool F has neared the display screen of the stereoscopic display unit 104, the stereoscopic display apparatus 100 proceeds with the process to step S103. On the other hand, in the case an operating tool F has not neared the display screen of the stereoscopic display unit 104, the stereoscopic display apparatus 100 returns the process to step S102.

When the process proceeds to step S103, the stereoscopic display apparatus 100 switches the display mode of the display object that is stereoscopically displayed to non-stereoscopic display, by using a function of the display control unit 102 (S103). Next, the stereoscopic display apparatus 100 detects whether or not the operating tool F has been removed from the display screen of the stereoscopic display unit 104, by using a function of the touch panel 101 (S104).

In the case the operating tool F has been removed from the display screen of the stereoscopic display unit 104, the stereoscopic display apparatus 100 proceeds with the process to step S105. On the other hand, in the case the operating tool F has not been removed from the display screen of the stereoscopic display unit 104, the stereoscopic display apparatus 100 returns the process to step S104. In the case the process proceeds to step S105, the stereoscopic display apparatus 100 switches the display mode of the display object that is non-stereoscopically displayed, i.e., a two-dimensional image, to stereoscopic display, by using a function of the display control unit 102 (S105).

In the foregoing, an operation of the stereoscopic display apparatus 100 according to the present embodiment has been described.

Modified Example

Figure 5:
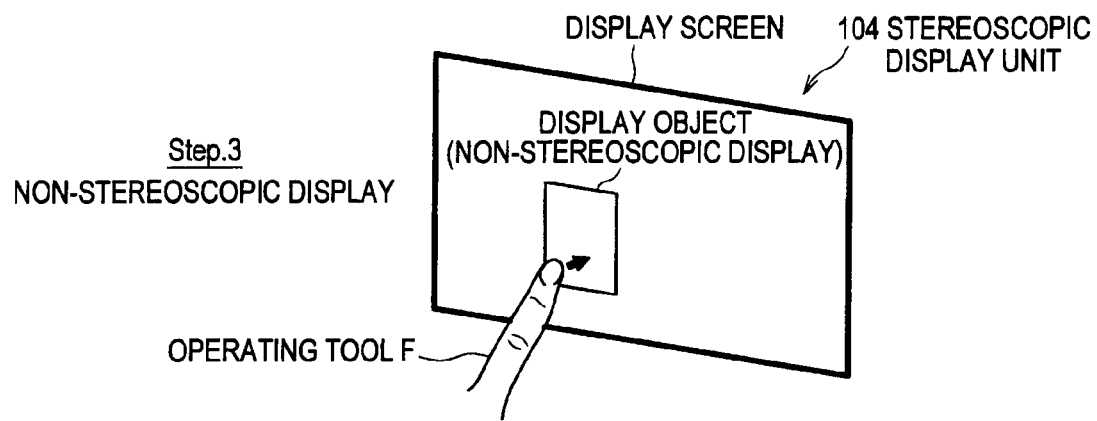
FIG. 5 is an explanatory diagram for describing a display control method (#1 (modified example)) according to the embodiment.

Next, FIG. 5 will be referred to. FIG. 5 is a modified example of the display control method shown in FIG. 3. The display control method which will be described here is for switching the display mode of a display object to non-stereoscopic display when an operating tool F nears the display screen, and pushing the display object inward into the display screen when the operating tool F contacts the display screen. FIG. 5 is an explanatory diagram for describing this display control method. Incidentally, only the operations following Step. 1 and Step. 2 shown in FIG. 3 are shown in FIG. 5. Thus, FIG. 3 will be referred to in relation to the operations of Step. 1 and Step. 2.

It is assumed as shown in FIG. 3 that a display object is stereoscopically displayed by the stereoscopic display unit 104 (Step. 1). When an operating tool F nears the display screen of this stereoscopic display unit 104 (Step. 2), the display control unit 102 switches the display mode of the display object that is stereoscopically displayed to non-stereoscopic display (Step. 3). Then, as shown in FIG. 5, when the operating tool F contacts the display screen of the stereoscopic display unit 104, the display control unit 102 switches the display mode of the display object that is non-stereoscopically displayed to stereoscopic display (Step. 4). However, the display control unit 102 causes the display object to be displayed in such a way that the display object is pushed inward into the display screen of the stereoscopic display unit 104.

In a case the display object is small, the display object may be hidden by the operating tool F when the operating tool F contacts the display screen of the stereoscopic display unit 104. However, as shown in FIG. 5, with the display object being pushed inward into the display screen following contact of the operating tool F, the display object is prevented from being hidden by the operating tool F. In FIG. 5, the display object is schematically displayed so as to be visible to a user, but in reality, the display object for a right eye and the display object for a left eye are displayed projecting on the left and right of the operating tool F. Accordingly, even if the display object is small, the display object will not be completely hidden by the operating tool F.

Such a display control method functions effectively in a situation where a display object, such as a button object, a menu object or the like, is to be operated by the operating tool F. This display control method functions effectively also in a situation where operation is performed over a certain period of time with the display object being contacted. For example, in a case of dragging the display object, the operating tool F has to be moved while being in contact with the display object. In such a case, if the display object is hidden by the operating tool F, it becomes difficult to see whether or not the display object is in contact with the operating tool F. However, when the display control method described above is applied, the movement of the display object moving following the operating tool F can be seen, and a user can confidently perform a drag operation.

In the foregoing, a modified example of the display control method according to the present embodiment has been described.

Figure 6:
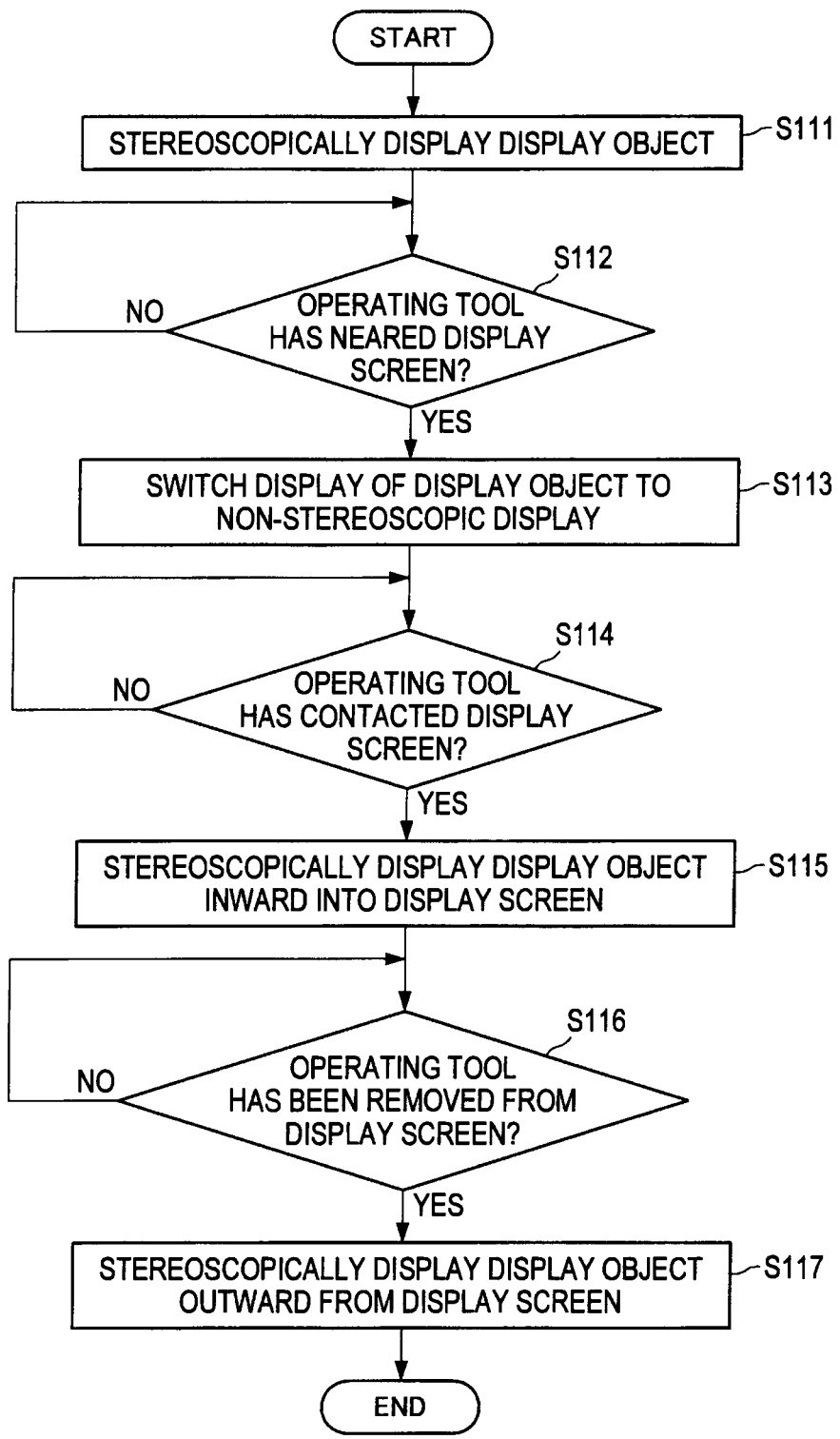
FIG. 6 is an explanatory diagram for describing an operation (#1 (modified example)) of the stereoscopic display apparatus according to the embodiment.

Next, FIG. 6 will be referred to. FIG. 6 is an explanatory diagram showing an operation of the stereoscopic display apparatus 100 for realizing the display control method which has been described with reference to FIGS. 3 and 5.

As shown in FIG. 6, the stereoscopic display apparatus 100 stereoscopically displays a display object on the stereoscopic display unit 104 by using a function of the display control unit 102 (S111). Then, the stereoscopic display apparatus 100 detects whether or not an operating tool F has neared the display screen of the stereoscopic display unit 104, by using a function of the touch panel 101 (S112). In the case an operating tool F has neared the display screen of the stereoscopic display unit 104, the stereoscopic display apparatus 100 proceeds with the process to step S113. On the other hand, in the case an operating tool F has not neared the display screen of the stereoscopic display unit 104, the stereoscopic display apparatus 100 returns the process to step S112.

When the process proceeds to step S113, the stereoscopic display apparatus 100 switches the display mode of the display object that is stereoscopically displayed to non-stereoscopic display, by using a function of the display control unit 102 (S113). Then, the stereoscopic display apparatus 100 detects whether or not the operating tool F has contacted the display screen of the stereoscopic display unit 104, by using a function of the touch panel 101 (S114). In the case the operating tool F has contacted the display screen of the stereoscopic display unit 104, the stereoscopic display apparatus 100 proceeds with the process to step S115. On the other hand, in the case the operating tool F has not contacted the display screen of the stereoscopic display unit 104, the stereoscopic display apparatus 100 returns the process to step S114.

When the process proceeds to step S115, the stereoscopic display apparatus 100 switches the display mode of the display object that is non-stereoscopically displayed to stereoscopic display, by using a function of the display control unit 102 (S115). At this time, the stereoscopic display apparatus 100 stereoscopically displays the display object in such a way that the display object is pushed inward into the display screen of the stereoscopic display unit 104. Then, the stereoscopic display apparatus 100 detects whether or not the operating tool F has been removed from the display screen of the stereoscopic display unit 104, by using a function of the touch panel 101 (S116). In the case the operating tool F has been removed from the display screen of the stereoscopic display unit 104, the stereoscopic display apparatus 100 proceeds with the process to step S117. On the other hand, in the case the operating tool F has not been removed from the display screen of the stereoscopic display unit 104, the stereoscopic display apparatus 100 returns the process to step S116.

When the process proceeds to step S117, the stereoscopic display apparatus 100 switches the display mode of the display object that is non-stereoscopically displayed to stereoscopic display (S117). Additionally, an explanation is given here assuming that the operating tool F contacts the display screen of the stereoscopic display unit 104, but in the case the operating tool F is removed from the display screen after the display mode of the display object is made non-stereoscopic display in step S113, the process of step S117 is performed.

In the foregoing, an operation of the stereoscopic display apparatus 100 according to a modified example of the present embodiment has been described.

(1-2-2: (#2) Inward Pushing of Display Object)

Figure 7:
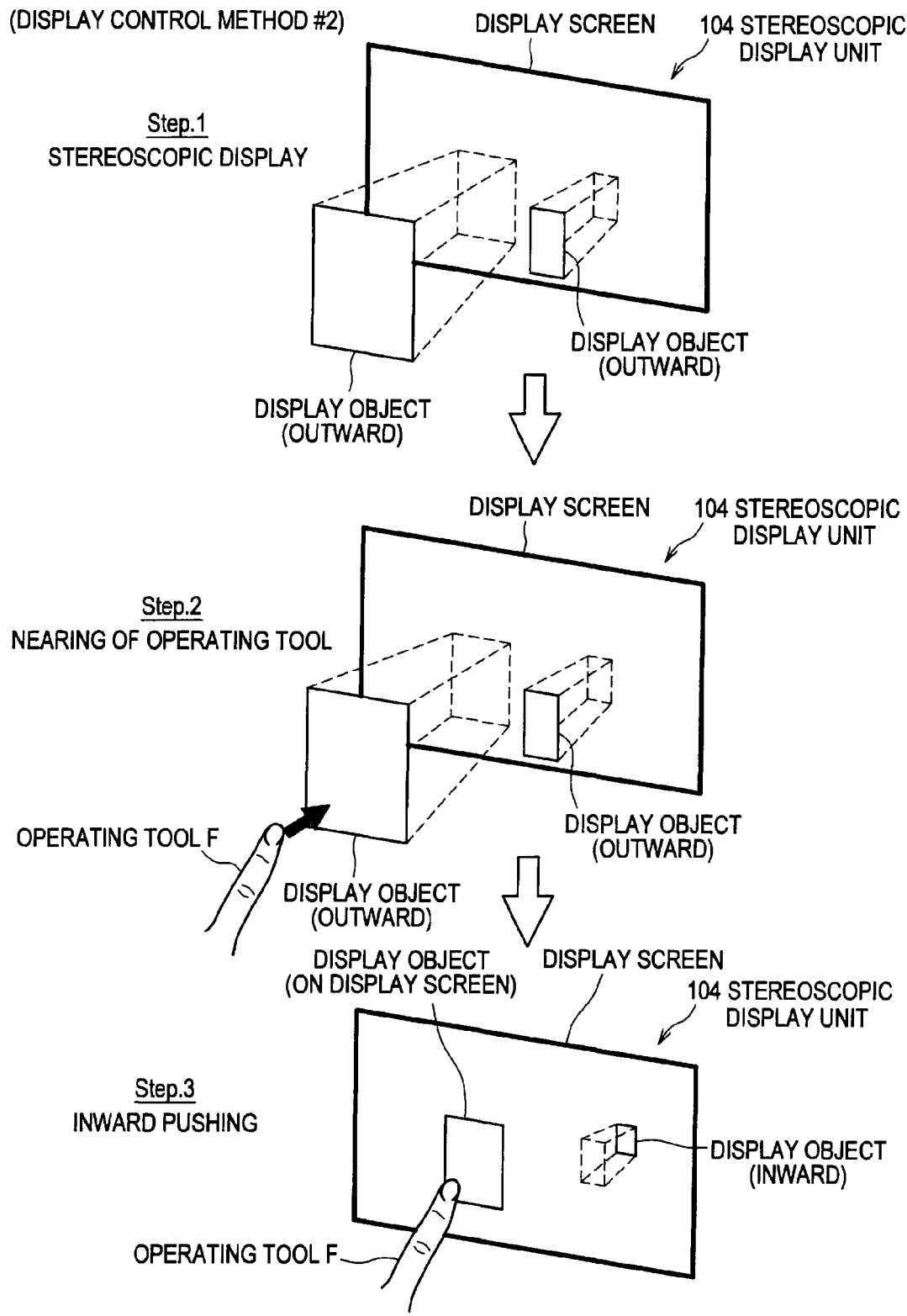
FIG. 7 is an explanatory diagram for describing a display control method (#2) according to the embodiment.

Next, FIG. 7 will be referred to. The display control method which will be described here is for pushing a display object that is stereoscopically displayed inward into the display screen when an operating tool F nears the display screen of the stereoscopic display unit 104. FIG. 7 is an explanatory diagram for describing this display control method. Additionally, in FIG. 7, a stereoscopic display object that is seen by a user is schematically shown.

It is assumed as shown in FIG. 7 that a display object is stereoscopically displayed outward from the display screen by the stereoscopic display unit 104 (Step. 1). When an operating tool F nears the display screen of this stereoscopic display unit 104 (Step. 2), the display control unit 102 displays the display object in such a way that the display object that is stereoscopically displayed is pushed inward into the display screen (Step. 3). If the display object is pushed inward into the display screen in Step. 3, the display object will not pop outward from the display screen, and thus the operating tool F will not be displayed buried in the display object and no mismatch will occur between the sense of distance to the display object and the sense of distance to the operating tool F. As a result, an odd feeling experienced by a user when the operating tool F nears the display object that is stereoscopically displayed can be reduced.

In the foregoing, the display control method according to the present embodiment has been described.

Figure 8:
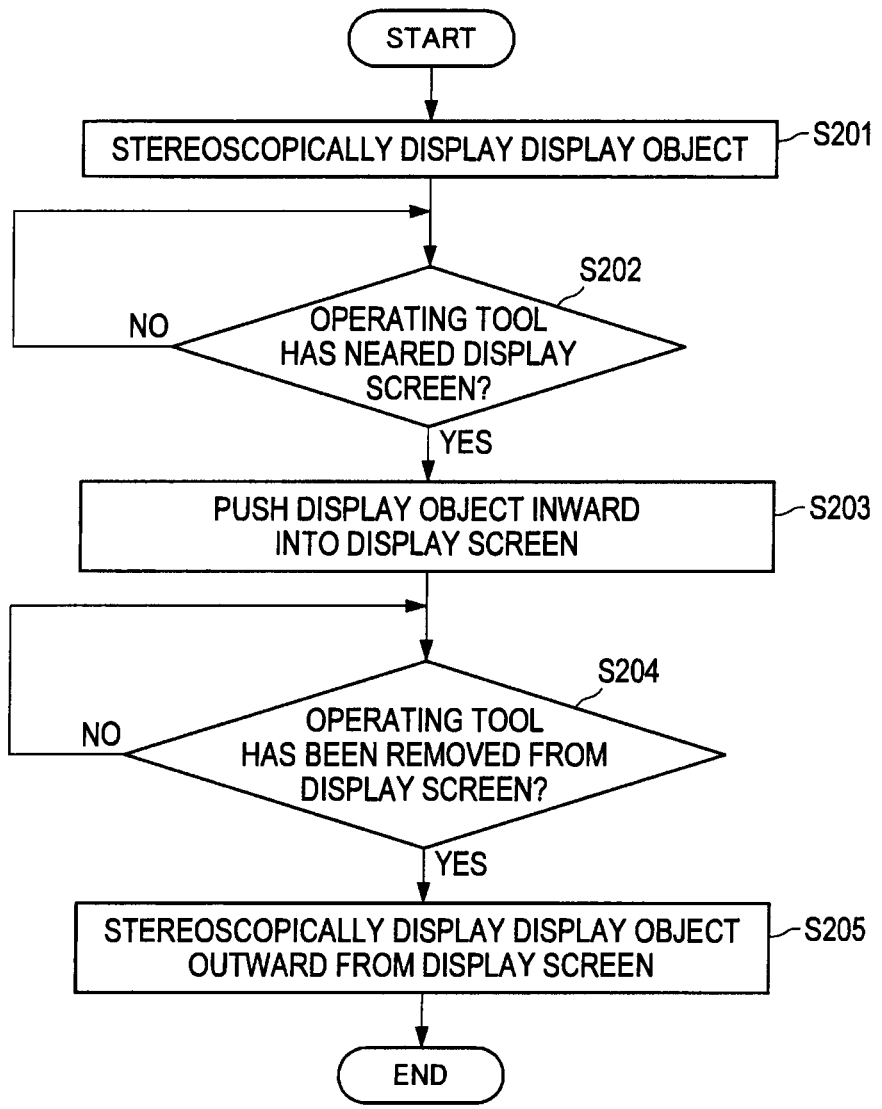
FIG. 8 is an explanatory diagram for describing an operation (#2) of the stereoscopic display apparatus according to the embodiment.

Next, FIG. 8 will be referred to. FIG. 8 is an explanatory diagram showing an operation of the stereoscopic display apparatus 100 for realizing the display control method which has been described with reference to FIG. 7.

As shown in FIG. 8, the stereoscopic display apparatus 100 stereoscopically displays a display object on the stereoscopic display unit 104 by using a function of the display control unit 102 (S201). Next, the stereoscopic display apparatus 100 detects whether or not an operating tool F has neared the display screen of the stereoscopic display unit 104, by using a function of the touch panel 101 (S202). In the case an operating tool F has neared the display screen of the stereoscopic display unit 104, the stereoscopic display apparatus 100 proceeds with the process to step S203. On the other hand, in the case an operating tool F has not neared the display screen of the stereoscopic display unit 104, the stereoscopic display apparatus 100 returns the process to step S202.

When the process proceeds to step S203, the stereoscopic display apparatus 100 stereoscopically displays, inward into the display screen, the display object that is stereoscopically displayed outward from the display screen, by using a function of the display control unit 102 (S203). That is, the stereoscopic display apparatus 100 pushes, inward into the display screen, the display object that is stereoscopically displayed outward from the display screen. Then, the stereoscopic display apparatus 100 detects whether or not the operating tool F has been removed from the display screen of the stereoscopic display unit 104, by using a function of the touch panel 101 (S204).

In the case the operating tool F has been removed from the display screen of the stereoscopic display unit 104, the stereoscopic display apparatus 100 proceeds with the process to step S205. On the other hand, in the case the operating tool F has not been removed from the display screen of the stereoscopic display unit 104, the stereoscopic display apparatus 100 returns the process to step S204. When the process proceeds to step S205, the stereoscopic display apparatus 100 stereoscopically displays, outward from the display screen, the display object which has been pushed inward into the display screen, by using a function of the display control unit 102 (S205).

In the foregoing, an operation of the stereoscopic display apparatus 100 according to the present embodiment has been described.

Modified Example

Figure 9:
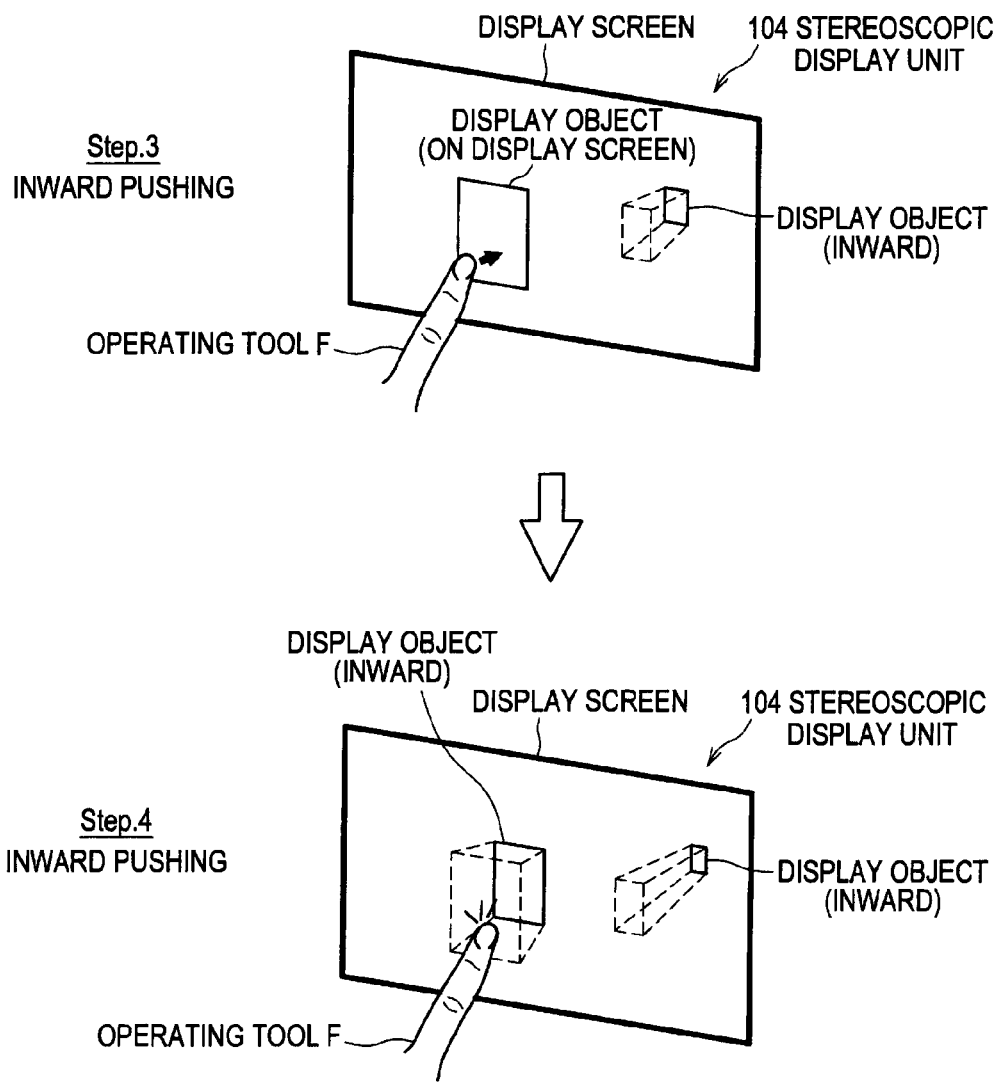
FIG. 9 is an explanatory diagram for describing a display control method (#2 (modified example)) according to the embodiment.

Next, FIG. 9 will be referred to. FIG. 9 is a modified example of the display control method shown in FIG. 7. The display control method which will be described here is for pushing a display object inward into the display screen when an operating tool F nears the display screen, and pushing the display object further inward when the operating tool F contacts the display screen. That is, this display control method is for pushing the display object inward into the display screen discretely according to the distance between the display screen and the operating tool F. FIG. 9 is an explanatory diagram for describing this display control method. Incidentally, only the operations following Step. 1 and Step. 2 shown in FIG. 7 are shown in FIG. 9. Thus, FIG. 7 will be referred to in relation to the operations of Step. 1 and Step. 2.

It is assumed as shown in FIG. 7 that a display object is stereoscopically displayed outward from the display screen by the stereoscopic display unit 104 (Step. 1). When an operating tool F nears the display screen of this stereoscopic display unit 104 (Step. 2), the display control unit 102 displays the display object, that is stereoscopically displayed, in such a way that the display object is pushed inward into the display screen (Step. 3). Then, as shown in FIG. 9, when the operating tool F contacts the display screen of the stereoscopic display unit 104, the display control unit 102 pushes, further inward, the display object that is displayed inward into the display screen (Step. 4). For example, the depth of a display object in the foremost layer is made zero relative to the display screen in Step. 3, and the display object in the foremost layer is displayed inward into the display screen in Step. 4.

In a case the display object is small, the display object may be hidden by the operating tool F when the operating tool F contacts the display screen of the stereoscopic display unit 104. However, as shown in FIG. 9, with a display object in the foremost layer being pushed inward into the display screen following contact of the operating tool F, all the display objects are prevented from being hidden by the operating tool F. In FIG. 9, the display object is schematically displayed so as to be visible to a user, but in reality, the display object for a right eye and the display object for a left eye are displayed projecting on the left and right of the operating tool F. Accordingly, even if the display object is small, the display object will not be completely hidden by the operating tool F.

Such a display control method functions effectively in a situation where a display object, such as a button object, a menu object or the like, is to be operated by the operating tool F. This display control method functions effectively also in a situation where operation is performed over a certain period of time with the display object being contacted. For example, in a case of dragging the display object, the operating tool F has to be moved while being in contact with the display object. In such a case, if the display object is hidden by the operating tool F, it becomes difficult to see whether or not the display object is in contact with the operating tool F. However, when the display control method described above is applied, the movement of the display object moving following the operating tool F can be seen, and a user can confidently perform a drag operation.

In the foregoing, a modified example of the display control method according to the present embodiment has been described.

Figure 10:
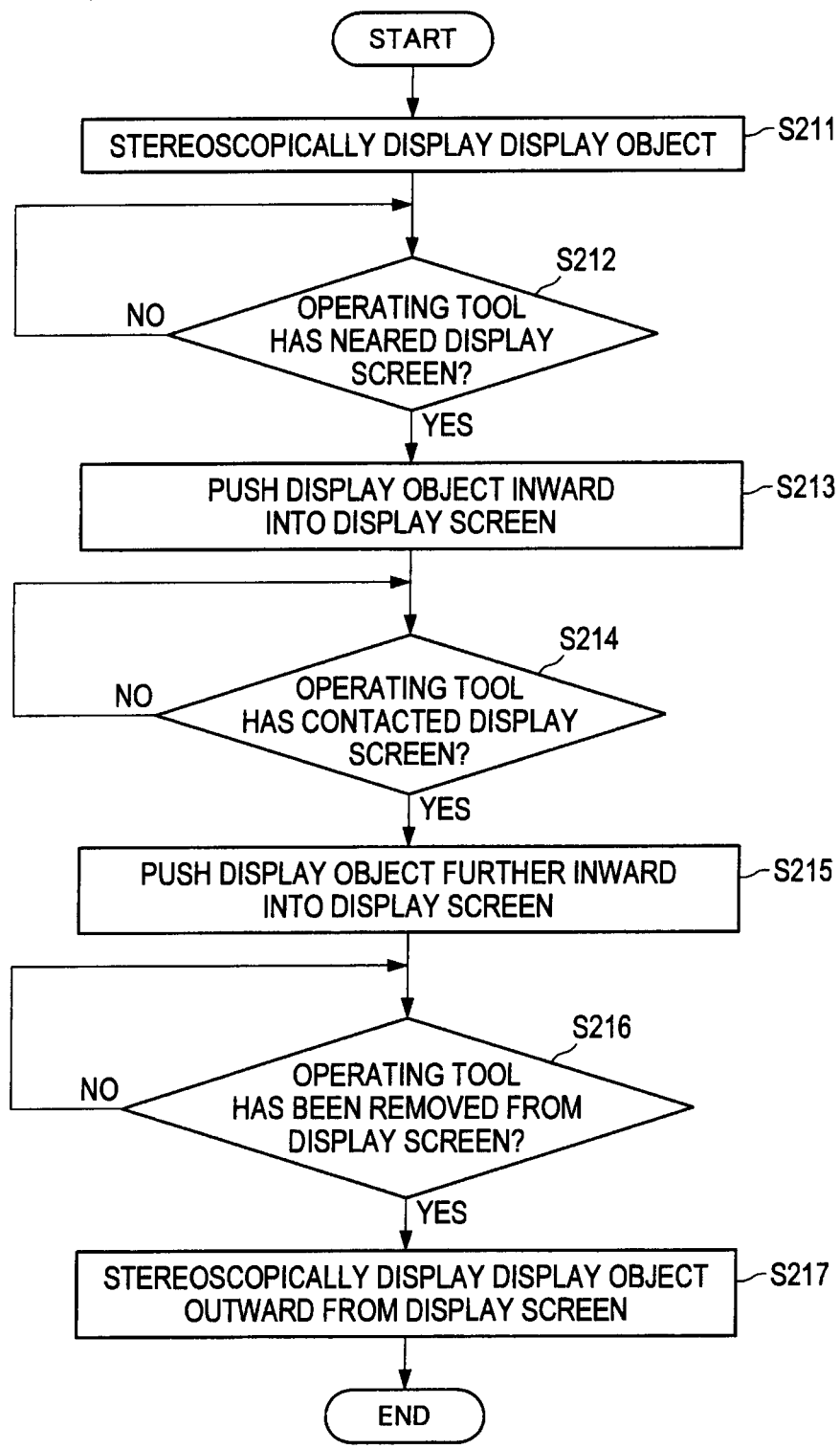
FIG. 10 is an explanatory diagram for describing an operation (#2 (modified example)) of the stereoscopic display apparatus according to the embodiment.

Next, FIG. 10 will be referred to. FIG. 10 is an explanatory diagram showing an operation of the stereoscopic display apparatus 100 for realizing the display control method which has been described with reference to FIGS. 7 and 9.

As shown in FIG. 10, the stereoscopic display apparatus 100 stereoscopically displays a display object on the stereoscopic display unit 104 by using a function of the display control unit 102 (S211). Then, the stereoscopic display apparatus 100 detects whether or not an operating tool F has neared the display screen of the stereoscopic display unit 104, by using a function of the touch panel 101 (S212). In the case an operating tool F has neared the display screen of the stereoscopic display unit 104, the stereoscopic display apparatus 100 proceeds with the process to step S213. On the other hand, in the case an operating tool F has not neared the display screen of the stereoscopic display unit 104, the stereoscopic display apparatus 100 returns the process to step S212.

When the process proceeds to S213, the stereoscopic display apparatus 100 pushes, inward into the display screen, the display object that is displayed outward from the display screen, by using a function of the display control unit 102 (S213). Then, the stereoscopic display apparatus 100 detects whether or not the operating tool F has contacted the display screen of the stereoscopic display unit 104, by using a function of the touch panel 101 (S214). In the case the operating tool F has contacted the display screen of the stereoscopic display unit 104, the stereoscopic display apparatus 100 proceeds with the process to step S215. On the other hand, in the case the operating tool F has not contacted the display screen of the stereoscopic display unit 104, the stereoscopic display apparatus 100 returns the process to step S214.

When the process proceeds to step S215, the stereoscopic display apparatus 100 pushes, further inward, the display object that is displayed inward into the display screen, by using a function of the display control unit 102 (S215). For example, the depth of a display object in the foremost layer is made zero relative to the display screen in step 213, and the display object in the foremost layer is displayed inward into the display screen in step S215.

Then, the stereoscopic display apparatus 100 detects whether or not the operating tool F has been removed from the display screen of the stereoscopic display unit 104, by using a function of the touch panel 101 (S216). In the case the operating tool F has been removed from the display screen of the stereoscopic display unit 104, the stereoscopic display apparatus 100 proceeds with the process to step S217. On the other hand, in the case the operating tool F has not been removed from the display screen of the stereoscopic display unit 104, the stereoscopic display apparatus 100 returns the process to step S216.

When the process proceeds to step S217, the stereoscopic display apparatus 100 stereoscopically displays, outward from the display screen, the display object that is displayed inward into the display screen (S217). Additionally, an explanation is given here assuming that the operating tool F contacts the display screen of the stereoscopic display unit 104, but in the case the operating tool F is removed from the display screen after the display object is displayed inward into the display screen in step S213, the process of step S217 is performed.

In the foregoing, an operation of the stereoscopic display apparatus 100 according to a modified example of the present embodiment has been described.

(1-2-3: (#3) Blurry Display of Display Object)

Figure 11:
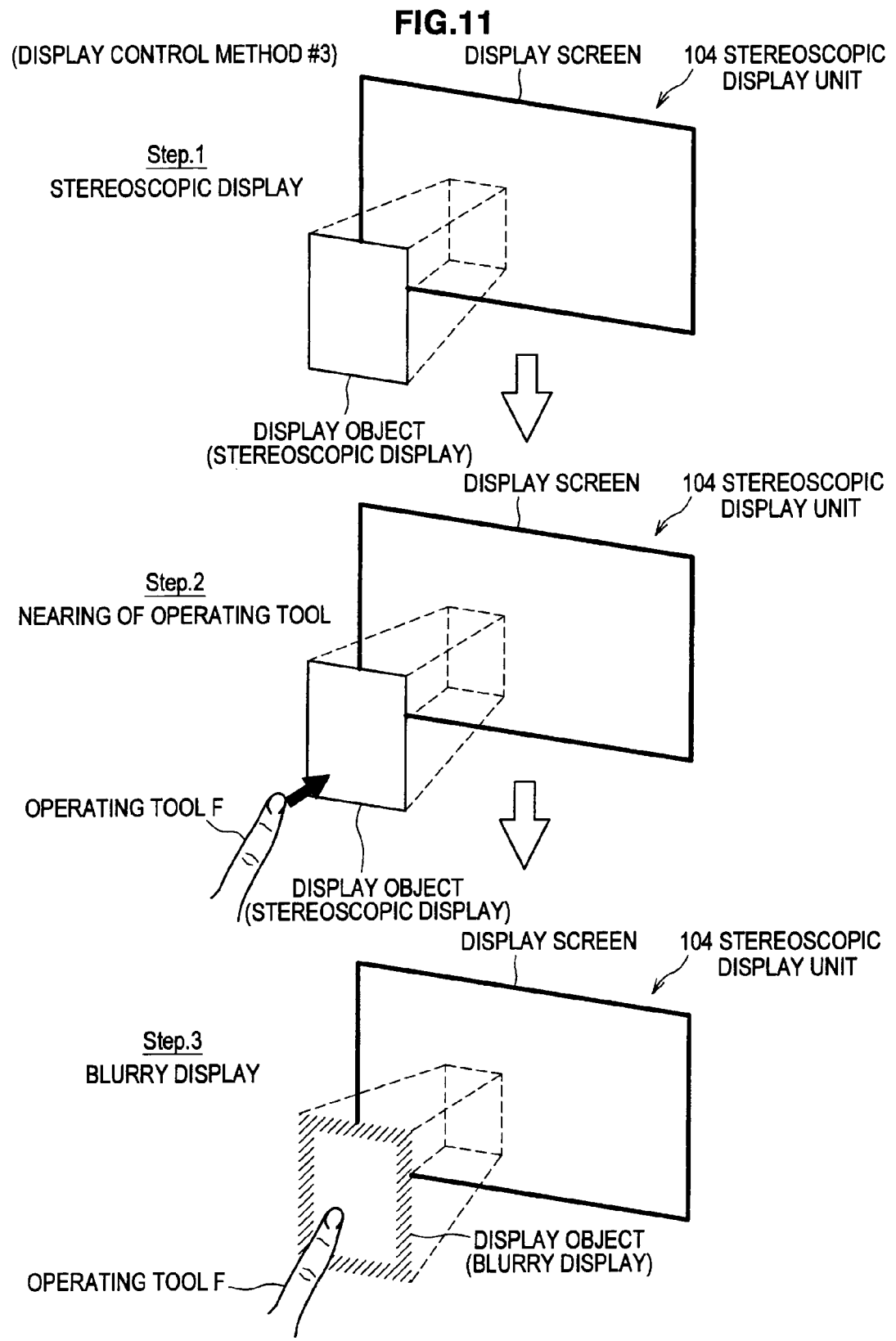
FIG. 11 is an explanatory diagram for describing a display control method (#3) according to the embodiment.

Next, FIG. 11 will be referred to. The display control method which will be described here is for blurrily displaying, when an operating tool F nears the display screen of the stereoscopic display unit 104, a display object which is stereoscopically displayed. FIG. 11 is an explanatory diagram for describing this display control method. Additionally, a stereoscopic display object that is seen by a user is schematically shown in FIG. 11.

It is assumed as shown in FIG. 11 that a display object is stereoscopically displayed outward from the display screen by the stereoscopic display unit 104 (Step. 1). When an operating tool F nears the display screen of this stereoscopic display unit 104 (Step. 2), the display control unit 102 blurrily displays the display object that is stereoscopically displayed (Step. 3). For example, the outline of the display object is blurrily displayed.

When the outline of the display object is blurred, the degree of pop-out of the display object becomes hard to perceive. Thus, when the display object is blurrily displayed in Step. 3, the sense of distance between the display screen and the display object becomes unclear, and the mismatch between the sense of distance to the display object and the sense of distance to the operating tool F is less apt to be felt. As a result, an odd feeling experienced by a user when the operating tool F nears the display object that is stereoscopically displayed can be reduced.

In the foregoing, the display control method according to the present embodiment has been described.

Figure 12:
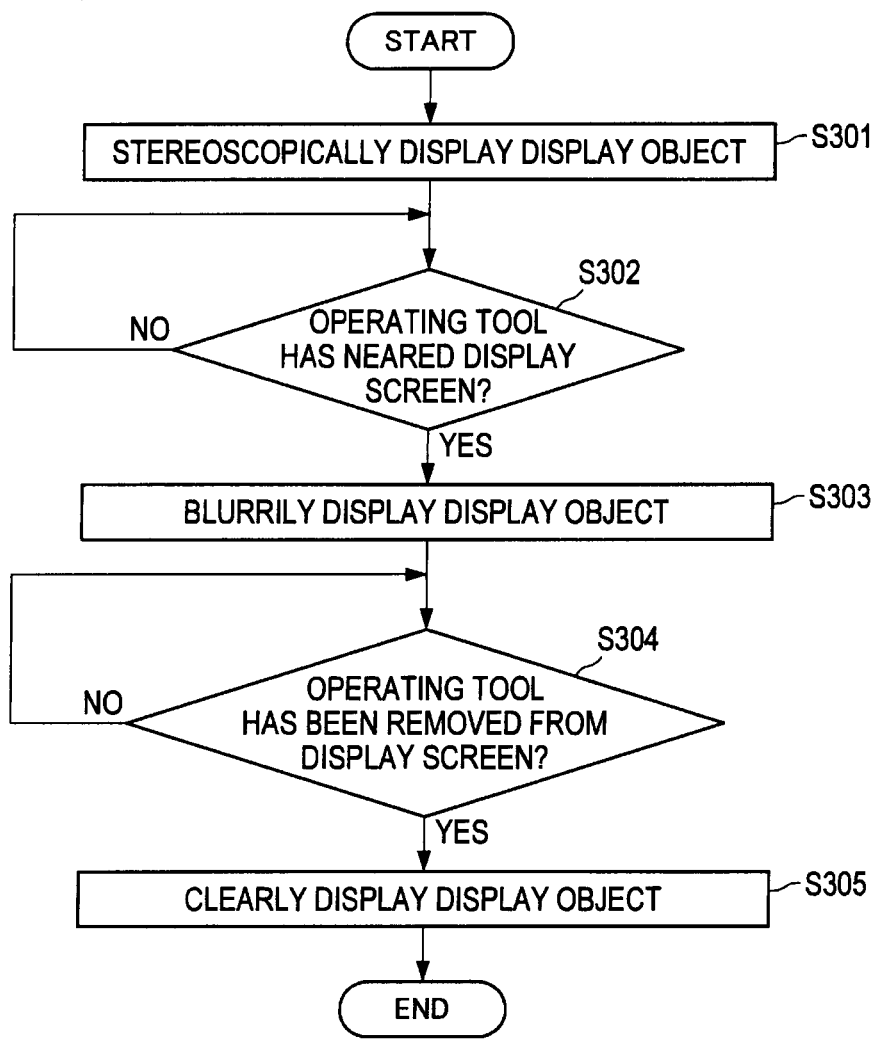
FIG. 12 is an explanatory diagram for describing an operation (#3) of the stereoscopic display apparatus according to the embodiment.

Next, FIG. 12 will be referred to. FIG. 12 is an explanatory diagram showing an operation of the stereoscopic display apparatus 100 for realizing the display control method which has been described with reference to FIG. 11.

As shown in FIG. 12, the stereoscopic display apparatus 100 stereoscopically displays a display object on the stereoscopic display unit 104 by using a function of the display control unit 102 (S301). Next, the stereoscopic display apparatus 100 detects whether or not an operating tool F has neared the display screen of the stereoscopic display unit 104, by using a function of the touch panel 101 (S302). In the case an operating tool F has neared the display screen of the stereoscopic display unit 104, the stereoscopic display apparatus 100 proceeds with the process to step S303. On the other hand, in the case an operating tool F has not neared the display screen of the stereoscopic display unit 104, the stereoscopic display apparatus 100 returns the process to step S302.

When the process proceeds to step S303, the stereoscopic display apparatus 100 blurrily displays the display object that is stereoscopically displayed, by using a function of the display control unit 102 (S303). For example, the stereoscopic display apparatus 100 blurrily displays the outline of the display object. Then, the stereoscopic display apparatus 100 detects whether or not the operating tool F has been removed from the display screen of the stereoscopic display unit 104, by using a function of the touch panel 101 (S304).

In the case the operating tool F has been removed from the display screen of the stereoscopic display unit 104, the stereoscopic display apparatus 100 proceeds with the process to step S305. On the other hand, in the case the operating tool F has not been removed from the display screen of the stereoscopic display unit 104, the stereoscopic display apparatus 100 returns the process to step S304. In the case the process proceeds to step S305, the stereoscopic display apparatus 100 clearly displays the display object that is blurrily displayed, by using a function of the display control unit 102 (S305).

In the foregoing, an operation of the stereoscopic display apparatus 100 according to the present embodiment has been described.

Modified Example

Figure 13:
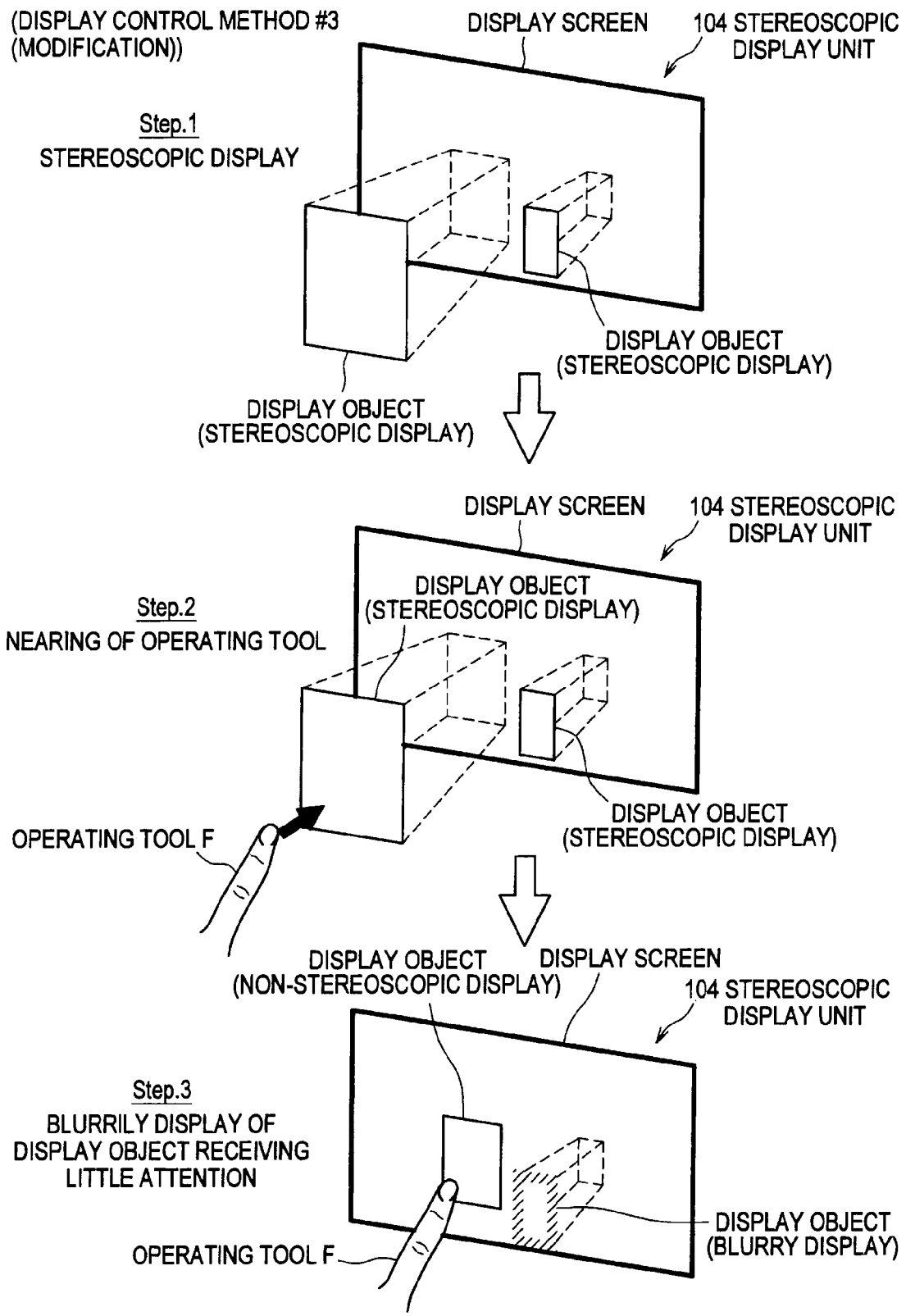
FIG. 13 is an explanatory diagram for describing a display control method (#3 (modified example)) according to the embodiment.

Next, FIG. 13 will be referred to. FIG. 13 is a modified example of the display control method shown in FIG. 11. The display control method which will be described here is for switching the display mode of a display object positioned near an operating tool F to non-stereoscopic display and blurrily displaying a display object, that is, content, positioned away from the operating tool F when the operating tool F nears the display screen of the stereoscopic display unit 104. FIG. 13 is an explanatory diagram for describing this display control method.

It is assumed as shown in FIG. 13 that a display object is stereoscopically displayed by the stereoscopic display unit 104 (Step. 1). When an operating tool F nears the display screen of this stereoscopic display unit 104 (Step. 2), the display control unit 102 switches the display mode of a display object that is positioned near the operating tool F to non-stereoscopic display and blurrily displays a display object that is positioned away from the operating tool F (Step. 3).

By switching stereoscopic display to non-stereoscopic display in this manner, the operating tool F will not be buried in the display object and no mismatch will occur between the sense of distance to the operating tool F and the sense of distance to the display object. Also, with the display object being blurrily displayed, the sense of distance to the display object becomes unclear, and thus an odd feeling experienced by a user due to the mismatch occurring between the sense of distance to the operating tool F and the sense of distance to the display object can be reduced.

In the foregoing, a modified example of the display control method according to the present embodiment has been described.

Figure 14:
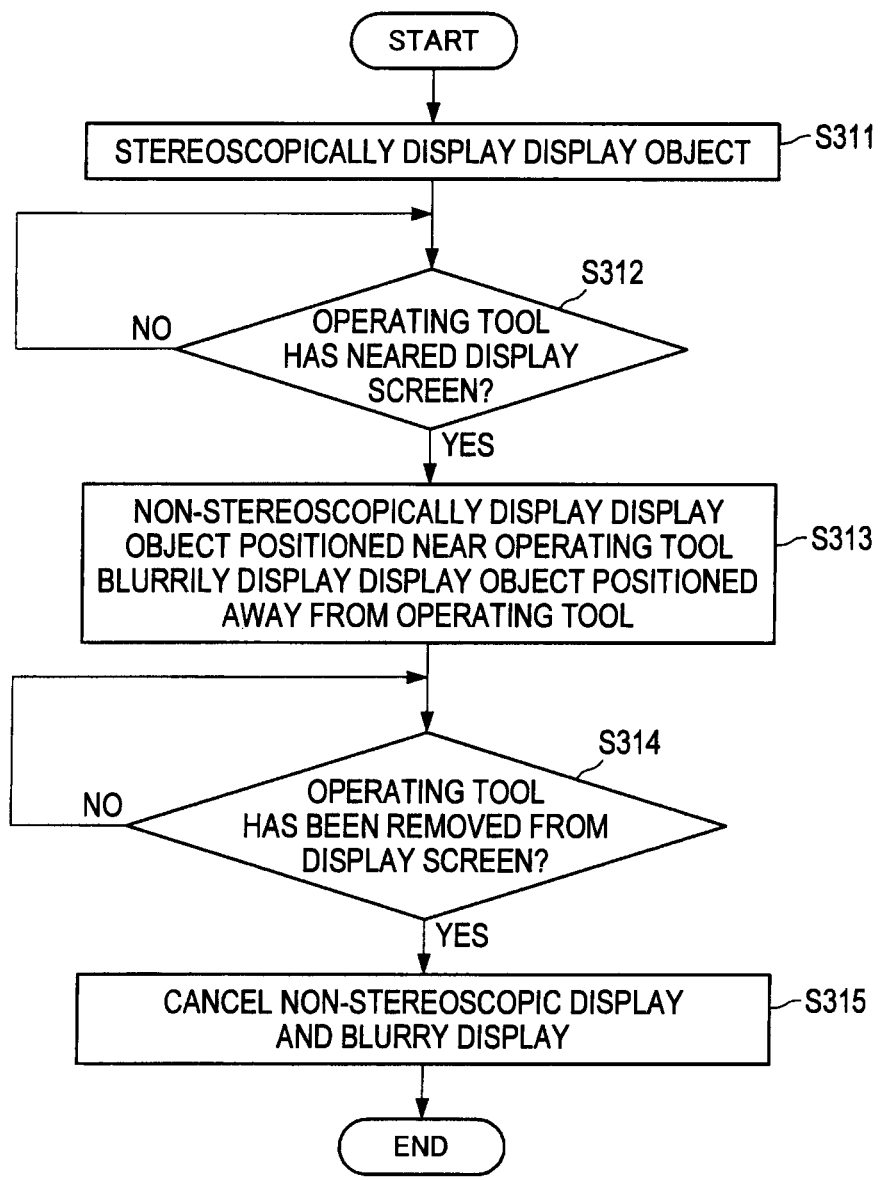
FIG. 14 is an explanatory diagram for describing an operation (#3 (modified example)) of the stereoscopic display apparatus according to the embodiment.

Next, FIG. 14 will be referred to. FIG. 14 is an explanatory diagram showing an operation of the stereoscopic display apparatus 100 for realizing the display control method which has been described with reference to FIG. 13.

As shown in FIG. 14, the stereoscopic display apparatus 100 stereoscopically displays a display object on the stereoscopic display unit 104 by using a function of the display control unit 102 (S311). Then, the stereoscopic display apparatus 100 detects whether or not an operating tool F has neared the display screen of the stereoscopic display unit 104, by using a function of the touch panel 101 (S312). In the case an operating tool F has neared the display screen of the stereoscopic display unit 104, the stereoscopic display apparatus 100 proceeds with the process to step S313. On the other hand, in the case an operating tool F has not neared the display screen of the stereoscopic display unit 104, the stereoscopic display apparatus 100 returns the process to step S312.

When the process proceeds to step S313, the stereoscopic display apparatus 100 non-stereoscopically displays a display object positioned near the operating tool F and blurrily displays a display object positioned away from the operating tool F, by using a function of the display control unit 102 (S313). Then, the stereoscopic display apparatus 100 detects whether or not the operating tool F has been removed from the display screen of the stereoscopic display unit 104, by using a function of the touch panel 101 (S314).

In the case the operating tool F has been removed from the display screen of the stereoscopic display unit 104, the stereoscopic display apparatus 100 proceeds with the process to step S315. On the other hand, in the case the operating tool F has not been removed from the display screen of the stereoscopic display unit 104, the stereoscopic display apparatus 100 returns the process to step S314. In the case the process proceeds to step S315, the stereoscopic display apparatus 100 stereoscopically displays the display object that is non-stereoscopically displayed and clearly displays the display object that is blurrily displayed, by using a function of the display control unit 102 (S315).

In the foregoing, an operation of the stereoscopic display apparatus 100 according to a modified example of the present embodiment has been described.

In the foregoing, an embodiment of the present disclosure has been described. As described above, by appropriately controlling the display mode of a display object according to nearing or contacting of an operating tool F, an odd feeling experienced by a user because of a mismatch occurring between the sense of distance to the display object that is stereoscopically displayed and the sense of distance to the operating tool F can be reduced.

Additionally, the display control methods described above can be applied in appropriate combination. Also, the display control methods may be separately used according to the type of the display object; for example, the display control method of blurrily displaying a display object according to nearing of an operating tool F is applied to a display object displayed in a status display area such as a remaining battery display or a time display, and a display control method of pushing a display object inward into the display screen according to nearing of the operating tool F is applied to a display object such as a GUI.

Furthermore, in the explanation above, a method of detecting three states, non-proximity, proximity and contact, by the touch panel 101 and controlling the display mode of a display object according to the detection result has been described. However, the display control method according to the present embodiment is not limited to such a method. For example, in the case the distance between the display screen and the display object can be discretely or successively detected by the touch panel 101, it is possible to discretely or successively push the display object deeper in the depth direction or to discretely or successively increase the degree of blurring, according to the distance. Such modifications are also included in the technical scope of the present embodiment.

[1-3: Hardware Configuration]

The function of each structural element of the stereoscopic display apparatus 100 described above can be installed, for example, in an information processing apparatus shown in FIG. 15. Furthermore, the function of each structural element is realized by controlling the hardware shown in FIG. 15 using a computer program. Additionally, the mode of this hardware is arbitrary, and it may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 15, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

2: Summary

Lastly, the technical contents according to the embodiment of the present disclosure will be briefly described. The technical contents stated here can be applied to various information processing apparatuses, such as a personal computer, a mobile phone, a portable game machine, a portable information terminal, an information appliance, a car navigation system, and the like.

The functional configuration of the information processing apparatus described above can be expressed as below. The information processing apparatus includes a stereoscopic display unit, a proximity detection unit, and a display control unit as below. The stereoscopic display unit is means for stereoscopically displaying a display object. Furthermore, the proximity detection unit is means for detecting nearing of an operating tool to the stereoscopic display unit. For example, the stereoscopic display unit can display objects used for operation, such as a button object and a menu object. Also, when a user nears an operating tool to an object used for operation, the proximity detection unit can detect the nearing of the operating tool to the object used for operation. That is, by using the stereoscopic display unit and the proximity detection unit in combination, a touch operation using an operating tool becomes possible.

However, when a display object that is stereoscopically displayed and the operating tool in the real world overlap each other at the time of the touch operation, a mismatch occurs between the senses of distance perceived by a user. For example, with regard to a display object displayed popping outward from a display screen, the operating tool will be displayed buried in the display object, and the hiding-and-being-hidden relationship between the operating tool and the display object will be lost. On the other hand, with regard to a display object that is displayed inward into the display screen, the relationship between the focal point of crystalline lenses for the operating tool and the focal point for the display object is lost. For these reasons, a user will experience an odd feeling with regard to the relationship between the operating tool and the display object.

To alleviate such an odd feeling, the display control unit described above causes, when nearing of the operating tool is detected by the proximity detection unit, the display object displayed on the stereoscopic display unit to be displayed inward into a display screen of the stereoscopic display unit, for example. That is, a display object that is displayed and that is most popped out will be displayed inward into the display screen, and other display objects will be displayed further inward. Therefore, no display object will be displayed before the operating tool. As a result, a mismatch, regarding the sense of distance, occurring between a display object that is stereoscopically displayed and an operating tool in the real world will be unnoticeable, and an odd feeling experience by a user can be alleviated.

Furthermore, as another configuration for alleviating an odd feeling as described above, the display control unit described above may be configured to cause, when nearing of the operating tool is detected by the proximity detection unit, the display object displayed on the stereoscopic display unit to be displayed non-stereoscopically, for example. If the display object is non-stereoscopically displayed, no mismatch will occur between the display object and the operating tool that has neared regarding the sense of distance, and there will be no odd feeling which is experienced by a user in a state where the display object is stereoscopically displayed. That is, by applying the configuration of the display control unit as described above, it becomes possible to avoid the mismatch, regarding the sense of distance, between a display object and an operating tool in the real world occurring at the time the operating tool is brought near the display screen by a user.

Furthermore, as another configuration for alleviating an odd feeling as described above, the display control unit described above may be configured to cause, when nearing of the operating tool is detected by the proximity detection unit, the display object displayed on the stereoscopic display unit to be blurrily displayed, for example. When a display object is blurrily displayed, it becomes difficult for a user to accurately perceive the sense of distance between the display object and the display screen. When making use of this effect, it becomes possible to reduce the mismatch, regarding the sense of direction, between a display object and the operating tool in the real world. That is, by applying the configuration of the display control unit as described above, the mismatch, regarding the sense of distance, between a display object that is stereoscopically displayed and the operating tool in the real world will be unnoticeable, and an odd feeling experience by a user can be alleviated.

(Notes)

The touch panel 101 described above is an example of a proximity detection unit. The stereoscopic display apparatus 100 described above is an example of an information processing apparatus.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-192248 filed in the Japan Patent Office on Aug. 30, 2010, the entire content of which is hereby incorporated by reference.

What is claimed is:

1. A method for displaying content to a user, comprising:
displaying a content object at a first outward 3D position at a first distance from a device;
detecting a second outward 3D position of an operating member in relation to the device and determining a second distance between the operating member and the device; and
altering display of the content object, if the second distance is less than or equal to the first distance, wherein the altering display of the content object substantially prevents interference between the content object and the operating member at the first outward 3D position.

2. The method of claim 1, wherein said altering the display of the content object comprises displaying the content object at a 2D position on a face of the device in relation to the user.

3. The method of claim 1, wherein said altering the display of the content object comprises displaying the content object in an inward 3D position in relation to the device and the user.

4. The method of claim 1, wherein:
the first distance is determined at a first time; and
the method further comprises determining, if the content object is in the second position at a second time, the second distance between the member and the device at the second time.

5. The method of claim 4, further comprising:
displaying, if the second distance is greater than or equal to the first distance, the content in the first 3D outward position.

6. The method of claim 4, further comprising:
displaying the content object in an inward 3D position if the second distance between the operating member and the device at the second time is zero.

7. The method of claim 6, further comprising:
determining, if the content object is in the inward 3D position at a third time, a third distance between the operating member and the device at the third time; and
displaying, if the third distance is greater than or equal to the predefined distance, the content in the first outward 3D position.

8. The method of claim 6, wherein the displaying the content in the inward 3D position is responsive to a touch operation between the operating member and the device.

9. The method of claim 1, wherein the content object is a first content object, and the method further comprises:
displaying a second content object, a third distance between the second content object and the operating member being greater than a distance between the first content object and the operating member; and
altering display of the second content object with an image quality less than an image quality of the first content, if the second distance between the operating member and the device is less than or equal to the third distance.

10. The method of claim 9, wherein:
the third distance is a first distance determined at a first time; and
the method further comprises:
determining the second distance between the operating member and the device at a second time, if the first content object is already altered; and
displaying the second content object with an image quality equal to the image quality of the first content, if the second distance is greater than or equal to the third distance.

11. The method of claim 1, wherein when the distance between the operating member and the device is less than the outward 3D position of the first content, then prior to the altering of the display of the first content the operating member appears to a user to be behind the outward 3D position of the first content prior to the altering of the display of the first content.

12. The method of claim 1, wherein said altering the display of the content object comprises displaying the content object at relatively low image quality.

13. The method of claim 12, wherein the relatively low image quality is a blurry image quality.

14. The method of claim 12, wherein the relatively low image quality is an image quality that visually contrasts the operating member from the content object from the perspective of the user.

15. The method of claim 1, wherein the interference is visual interference when the operating member at the second distance is closer to the device than the first outward 3D position of the content object.

16. The method of claim 15, wherein the visual interference is 3D overlap of the content object and the operating member.

17. A non-transitory computer-readable medium storing instructions which, when executed by a processor, perform a method of displaying content to a user, the method comprising:
displaying a content object at a first outward 3D position at a first distance from a device;

detecting a second outward 3D position of an operating member in relation to the device and determining a second distance between the operating member and the device; and altering display of the content object, if the second distance is less than or equal to the first distance, wherein the altering display of the content object substantially prevents interference between the content object and the operating member at the first outward 3D position.

18. An apparatus for displaying content to a user, comprising:

a memory; and a processor executing instructions stored in the memory to:

display a content object at a first outward 3D position at a first distance from a device;

detect a second outward 3D position of an operating member in relation to the device and determine a second distance between the operating member and the device; and alter the display of the content object, if the second distance is less than or equal to the first distance, wherein the altering display of the content object substantially prevents interference between the content object and the operating member at the first outward 3D position.

19. The apparatus of claim 18, wherein the device is a display screen.

\* \* \* \* \*